United States Patent
Vetter et al.

(10) Patent No.: US 8,156,061 B2
(45) Date of Patent: Apr. 10, 2012

(54) VALIDATING A STANDARDIZED CONFIGURATION DESCRIPTION

(75) Inventors: Claus Vetter, Buchs (CH); Christian Frei, Fislisbach (CH); Michael Obrist, Baden (CH)

(73) Assignee: ABB Research Ltd, Zurich (CH)

( * ) Notice: Subject to any disclaimer, the term of this patent is extended or adjusted under 35 U.S.C. 154(b) by 990 days.

(21) Appl. No.: 12/076,861

(22) Filed: Mar. 24, 2008

(65) Prior Publication Data

US 2008/0234872 A1   Sep. 25, 2008

(51) Int. Cl.
*G06F 17/00* (2006.01)
*G06F 17/27* (2006.01)

(52) U.S. Cl. .......................................... 706/45; 715/234
(58) Field of Classification Search .................... None
See application file for complete search history.

(56) References Cited

U.S. PATENT DOCUMENTS

| | | |
|---|---|---|
| 6,882,888 B2 | 4/2005 | Wimmer et al. |
| 2005/0182979 A1 | 8/2005 | Gross et al. |

FOREIGN PATENT DOCUMENTS

| | | |
|---|---|---|
| JP | 2002-295064 | 10/2002 |
| WO | WO 2006/060371 A2 | 6/2006 |

OTHER PUBLICATIONS

Ziring, Specification for the Extensible Configuration Checklist Description Format (XCCDF) [online], Jan. 2005 [retrieved on May 21, 2011]. Retrieved from the Internet:URL:<http://www.immagic.com/eLibrary/ARCHIVES/GENERAL/US_DOC/C050100Z.pdf>.*
IEC, Technical Specification [online], Edition 1.0 Dec. 2008 [retrieved on May 27, 2011]. Retrieved from the Internet:< URL:http://webstore.iec.ch/preview/info_iec61850-80-1%7Bed1.0%7Den.pdf>.*
Crispino F et al.: "An experiment using an object-oriented standard-IEC 61850 to integrated IEDs systems in substations", Transmission and Distribution Conference and Exposition: Latin America, 2004 IEEE/PES Sao Paulo, Brazil Nov. 8-11, 2004 Piscataway, NJ USA, IEEE, US Nov. 8, 2004 pp. 22-27 XP010799829.

* cited by examiner

*Primary Examiner* — Jeffrey A Gaffin
*Assistant Examiner* — Nathan Brown, Jr.
(74) *Attorney, Agent, or Firm* — Buchanan Ingersoll & Rooney PC

(57) ABSTRACT

The present disclosure is concerned with a validation of a configuration description of automated devices in a power network such as a Substation Automation (SA) system, or of a part or component thereof such as an individual Intelligent Electronic Device (IED), that is extended beyond the mere XML schema validation as provided by the known SCL-validation tools. In particular, the disclosure introduces machine-based validation of notations, requirements and/or conventions to be respected by the configuration description and/or the SA system, but not incorporated in or represented by the standardized syntax of the XML schema as defined in part 6 of the IEC 61850 standard. To this end, notations, requirements and/or conventions are initially converted into, or defined as, extended or augmented rules encoded in computer readable format. The content or information of a file having an Substation Configuration description Language (SCL) compliant description of an SA system, or of a part or component there of, is then read by parsing the file and checked for conformance to the rules. Any inconsistency, error, wrong configuration or insufficient description found is displayed to a user, who may then correct the content or information in the file. The procedure according to the disclosure can contribute, in an automated manner, to the correctness of the description of a Substation Automation (SA) system beyond the pure syntactical adherence to the IEC 61850 standard.

13 Claims, 1 Drawing Sheet

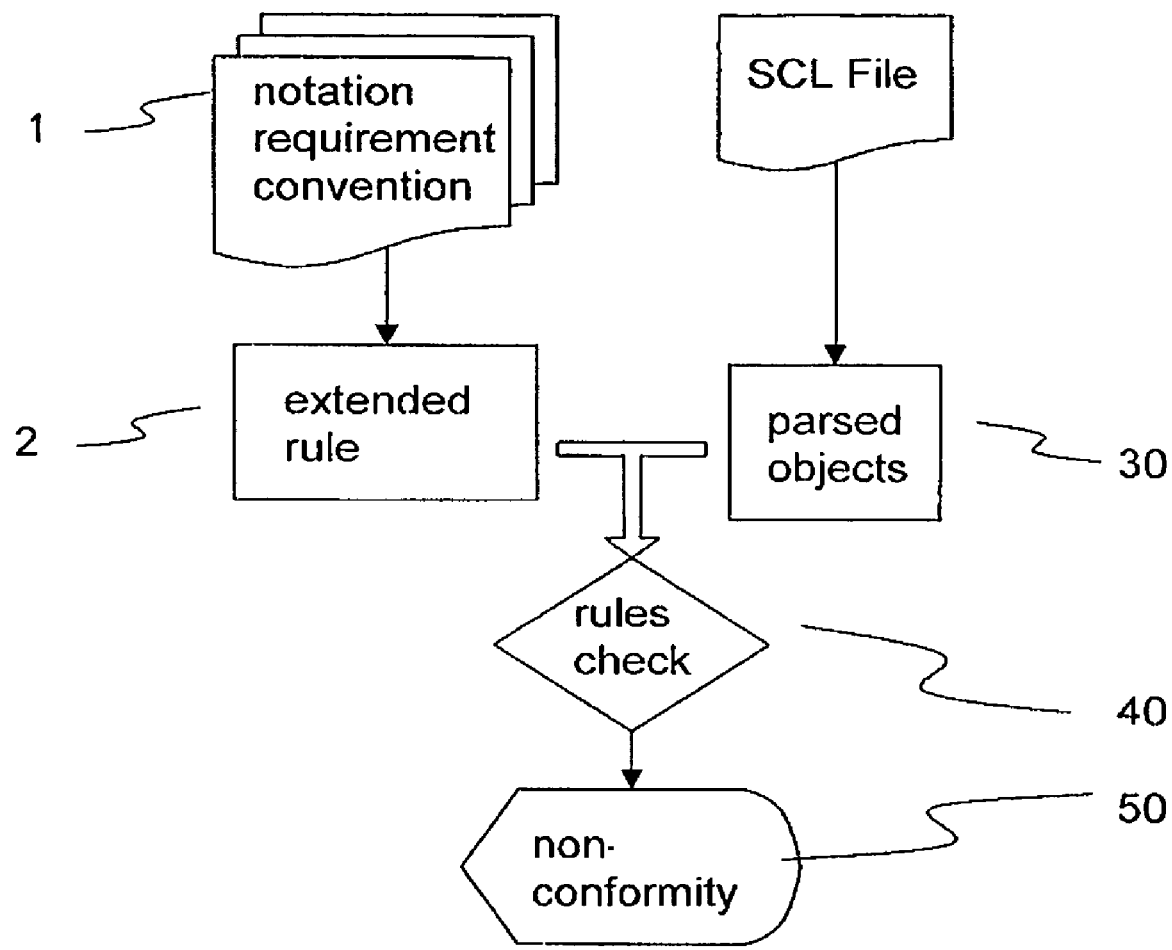

VALIDATING A STANDARDIZED CONFIGURATION DESCRIPTION

RELATED APPLICATION

This application claims priority under 35 U.S.C. §119 to European Patent Application No. 07104662.7 filed in the European Patent Office on 22 Mar. 2007, the entire content of which is hereby incorporated by reference in its entirety.

TECHNICAL FIELD

The disclosure relates to the field of Substation Automation systems with a standardized configuration representation. More particularly, it relates to validating a standardized configuration description of a Substation Automation system or of an Intelligent Electronic Device as a constituent of the former.

BACKGROUND INFORMATION

An electric power system comprises a power transmission and/or distribution network interconnecting geographically separated regions, and a plurality of substations at the nodes of the power network. The substations include equipment for transforming voltages and for switching connections between individual lines of the power network. Power generation and load flow to consumers is managed by a central Energy Management System (EMS) and/or supervised by a Supervisory Control And Data Acquisition (SCADA) system located at a Network Control Centre (NCC).

Substations in high and medium voltage power networks include primary devices such as electrical cables, lines, bus bars, switches such as breakers or disconnectors, power transformers and instrument transformers, which are generally arranged in switch yards and/or bays. These primary devices are operated in an automated way via a Substation Automation (SA) system responsible for protecting, controlling, measuring and monitoring of substations. The SA system comprises secondary devices, so-called digital relays, which are interconnected in an SA communication network, and which interact with the primary devices via a process interface. These devices are generally assigned to one of three hierarchical levels, which are (a) the station level including an Operator Work Station (OWS) with a Human-Machine Interface (HMI) as well as the gateway to the Network Control Centre (NCC), (b) the bay level with its devices for protection, control and measurement, and (c) the process level comprising e.g. electronic sensors for voltage, current and gas density measurements as well as contact probes for sensing switch and transformer tap changer positions, as well as actuators controlling the drive of a switch or tap changer. At the process level, intelligent actuators may be integrated in the respective primary devices and connected to a bay unit via a serial link or an optical process bus. The bay units are connected to each other and to the devices on the station level via an inter-bay or station bus.

Today's SA systems desire interoperability between all substation devices independently of their manufacturer. To that effect, an internationally accepted standard for communication between the secondary devices of a substation has been introduced by the International Electrotechnical Committee under the name of IEC 61850 "communication networks and systems in substations". All EEC 61850 compliant devices connected to the SA network are called Intelligent Electronic Devices (IED).

IEC 61850 defines an abstract object model for compliant substations, and a method how to access these objects over a network. This allows the substation-specific applications such as the OWS to operate with standard objects, while the actual objects in the substation may be realized differently by the IEDs of different manufacturers. The abstract object model according to the above standard represents the SA functionality in terms of logical nodes within logical devices that are allocated to the IEDs as the physical devices.

IEC 61850 communication protocols for non-time critical messages are client-server based, which enables several clients to access data from a server, define the semantics of the data within the substation in a standardized object-oriented way, and offer a standardized method to transfer data between different engineering tools in a standardized format. The communication between IEDs is handled, for non-time critical messages, via a Manufacturing Message Specification (MMS) communication stack built on OSI/TCP/IP/Ethernet, or for time critical messages, via so-called Generic Object Oriented Substation Events (GOOSE) that build directly on the Ethernet link layer of the communication stack. Very time-critical signals at the process level such as trip commands and analogue voltages or currents use a simplified variant of GOOSE known as SV (Sampled Values) that also builds directly on the Ethernet link layer.

One consequence of interoperability mentioned above is that IEDs from different suppliers may be combined into one SA system. Since the IEDs are initially configured during an engineering phase, the corresponding dedicated engineering or SA configuration tools of the different suppliers exchange information about the IEDs. To this effect, the complete SA system with all its primary devices, IEDs and communication links should be specified in a computer-readable manner. This is enabled by the comprehensive XML-based Substation Configuration description Language (SCL) that is part of the IEC 61850 standard. In short, the IEC 61850 SCL language provides for a standardized description of the primary devices, the secondary devices with their Protection, Control and Monitoring (PCM) functions, the logical structure of the communication system, and the relation between the IEDs and the primary devices. Therefore, IEC 61850 SCL enables an automated configuration of the IEDs.

The SCL language is used to describe the capabilities of a particular IED or IED type in an IED Capability Description (ICD) file that lists the application functions of a physical device, e.g. its implemented protection functionality. A Configured IED Description (CID) includes further the communication properties of the IED, e.g. its unique IP address. A Substation Configuration Description (SCD) file in the SCL language describes the primary objects, the functions implemented in each IED in terms of logical nodes, and the communication connections of a particular substation. Therefore, the SCD file comprises (1) a switch yard naming and topology description, (2) an IED configuration description, (3) the relationship between switch yard elements and IED functions, and (4) a description of a communication network. Accordingly, if a particular IED is used within an SA system, an object instance of the IED type is inserted into the corresponding SCD file. The SCL language then enables specifying typical or individual values for the data attributes carried by the data instance, related to the particular IED, e.g. values of the configuration attributes and setting parameters. The connection between the power process and the SA system is described in the SCL language by allocating or attaching logical nodes to elements of the primary equipment. A switch control logical node can be attached to a switching device, whereas a measurement logical node is allocated to an instrument transformer. The semantic meaning of a function within an SA system is determined by the logical node type or class, in combination with the switch yard and/or bay to which it is allocated.

A file in the IEC61850-conformant description language SCL, including the above mentioned SCD or ICD files relating to the configuration of the station and the automation devices, describes an instance of the SCL object model in a serialized form and with a standardized syntax. Its syntax definition is described in IEC 61850, Part 6, as an XML schema and as such encoded in computer readable form. Established software tools allow validating an SCL file against Part 6 of IEC 61850 through XML schema validation at syntax level.

On the other hand, the semantics or content of an SCL file is independent from the syntax and can only be fully understood by reference to the SCL object model itself. In other words, successful validation of the SCL file in terms of adherence to the SCL schema does not necessarily imply that the SCL file is valid or conformant in the sense of substation automation (conformity to plaintext parts of the standard IEC 61850) as well as power system operation or user specification (conformity to project/application). In other words, there is no automated detection of inconsistencies in SCL files related to the following extended constraints:

1. IEC 61850 defined notations other than those in the SCL-schema of Part 6, especially the conceptual data model defined in Parts 7-2, 7-3, 7-4 and 8-1 of the standard.
2. Application specific, project specific or other user defined requirements.
3. General power system conventions.

SUMMARY

Exemplary embodiments disclosed herein can increase the availability and ensure proper operation of a Substation Automation system. A method of and a computer program for validating a standardized configuration description of a Substation Automation system are disclosed.

A method of validating a configuration description of automated devices in a power network (e.g., a Substation Automation system and/or Intelligent Electronic Device) is disclosed, wherein said description is encoded in a standardized configuration description language based on an XML schema, and wherein said description is subject to notations, requirements and/or conventions which are not incorporated in said XML schema, comprising: identifying the notations, requirements or conventions to be validated; generating therefrom extended rules in a computer-readable format; checking said description for conformance to the extended rules; and issuing, in case a discrepancy is found, a notification to a user.

A computer program for validating a configuration description of a Substation Automation (SA) system or of an Intelligent Electronic Device (IED) is disclosed, wherein said description is encoded in a Standardized Configuration description Language (SCL) based on an XML schema, and wherein said description is subject to notations, requirements and/or conventions which are not incorporated in said XML schema, the computer program performing, when executed, the steps: of checking said description for conformance with extended rules generated in a computer-readable format from the notations, requirements or conventions to be validated, and issuing, in case a discrepancy is found, a notification to a user.

BRIEF DESCRIPTION OF THE DRAWINGS

The subject matter of the disclosure will be explained in more detail in the following text with reference to exemplary embodiments which are illustrated in the attached drawing, in which:

FIG. 1 shows an exemplary flow chart of a procedure of validating an SCL file.

DETAILED DESCRIPTION

According to the disclosure, a validation of a configuration description of automated devices in a power network, such as a Substation Automation (SA) system, or of a part or component thereof such as an individual Intelligent Electronic Device (IED), is extended beyond the mere XML schema validation as provided by the above-mentioned SCL-validation tools. In particular, the disclosure introduces machine-based validation of notations, requirements and/or conventions to be respected by the configuration description and/or the SA system, but not incorporated in or represented by the standardized syntax of the XML schema as defined in part 6 of the IEC 61850 standard. To this end, said notations, requirements and/or conventions are initially converted into, or defined as, extended or augmented rules encoded in computer readable format. The content or information of a file comprising an Substation Configuration description Language (SCL) compliant description of an SA system, or of a part or component there of, is then read by parsing the file and checked for conformance to said rules. Any inconsistency, error, wrong configuration or insufficient description found is displayed to a user, who may then correct the content or information in the file.

The procedure according to the disclosure contributes, in an automated manner, to the correctness of the description of a Substation Automation (SA) system beyond the pure syntactical adherence to the IEC 61850 standard. As a consequence, the availability of an SA system relying heavily on this description is increased, and proper operation of the former can be expected. It is to be noted that manual detection of the aforementioned inconsistencies is close to impossible due to the sheer quantity of data (typically in excess of 20,000 lines of code) to be checked for each substation.

The procedure according to the disclosure can be performed at an engineering stage of the SA system, i.e. off-line and long before the first IED is actually put into operation, and thus prior to the commissioning or testing of the SA system. Since the engineering process comprises error-prone processes such as signal mapping (mapping I/O to function blocks) and protection/control function configuration (setting min/max values, parameters), the conformance of the resulting SA system description can be verified right upon its creation. Obviously, upon addition of an IED to the SCD file at a subsequent stage, e.g. during commissioning, the procedure may be beneficially repeated.

In a first exemplary embodiment of the disclosure, consistency checks are performed with respect to notations defined in IEC 61850, especially the conceptual data model defined in Part 7-2, 7-3 and 7-4 of the standard. Likewise, application specific, project specific or other user defined requirements or constraints may be checked. In a third exemplary embodiment, general power system conventions originating from common domain knowledge, encompassing e.g. the fact that a bay should include at least a connectivity node or at least some type of conducting equipment, are verified.

The disclosure can offer simplifying the development of any IEC 61850-compliant application (protection/control functionality) by ensuring that input SCL files as initially engineered are conformant, with fewer remaining error cases to be treated only during execution of the application.

Although the present application focuses on Substation Automation, it is evident that the principles and methods are likewise applicable to other technical domains characterized by different semantic data rules, such as wind power, hydro power and Distributed Energy Resources (DER). Likewise, it is evident that the code of the computer program may be stored in a computer program product, e.g. in a computer readable medium, either in the memory of a computer or other device for performing the validation, or on a data carrier that can be inserted into the computer or device.

FIG. 1 shows a flowchart of an extended process of validating or verifying a Substation Configuration Language (SCL) file according to the disclosure. In step 10, notations, requirements or conventions to be validated beyond the mere XML schema validation are identified. The former may include any conceivable constraint to which the description is subjected, or only a selected number of application-dependent or user-dependent constraints. It may include defined proprietary extensions (e.g., for a logical node) that can be described in a standard manner in another rules file(s)—however in another namespace than "IEC 61850-7-4:2003". In step 20, the constraints identified are translated into extended rules in a machine-readable form. In this context, it is to be noted that the extended rules may not only be generated from plain text, but also on the basis of graphical representations, or a mixed form, of the notations, requirements or conventions to be validated. The rules may or may not be representing physical or communication-related aspects of the SA system.

These rule, or a subset thereof, are imported into a computer program for subsequent repeated use, and need to be updated only upon a change in the underlying language or in the rules. In step 30, the information or content from an SCL file is read through parsing the SCL file. The information is stored in a computer implemented model, hereafter called the "parsed objects". The parsed objects are then checked for conformity to the rules in step 40. If no inconsistency is detected, the SCL file is validated, otherwise a message is output to a user in step 50.

The computer readable format into which the rules are coded may be XML which is also human-readable to some extent. By way of example, the constraints in plain text "a battery has at most one terminal" is then translated into the rule <Equipment code="BAT" maxTerminals="1"/>. Other exemplary rules are listed below:

| Plain text of Part 7-2 | Rule in XML format |
|---|---|
| Section 19.2 of Part 7-2 defines the allowed characters and the min/max length of the name of different concepts. For instance, a DATA name cannot contain more than 10 characters, and can be made of only upper/lower-case characters, 0-9, and the underscore. | <NameConstraint element="DATA" minChars="1" maxChars="10" lowerCaseLetter="true" upperCaseLetter="true" digit="true" underscore="true"/> |

| Plain text of exemplary convention | Rule in XML format |
|---|---|
| A circuit breaker shall have | <Equipment code="CBR"> |
| At least one XCBR LN, at most 4 | <LNode lnClass="XCBR" min="1" max="4"/> |
| At most one CSWI LN | <LNode lnClass="CSWI" min="0" max="1"/> |
| At most one RREC LN | <LNode lnClass="RREC" min="0" max="1"/> |
| At most one RSYN LN | <LNode lnClass="RSYN" min="0" max="1"/> |
| Any number of CILO LN | <LNode lnClass="CILO" min="0" max="*"/> |
| At most one PTRC LN | <LNode lnClass="PTRC" min="0" max="1"/> |
| Any number of SIML LN | <LNode lnClass="SIML" min="0" max="*"/> |
| Any number of CALH LN | <LNode lnClass="CALH" min="0" max="*"/> |
| Any number of LNs of group "G" | <LNodeGroup group="G"/> |
| | </Equipment> |

Further examples of errors, wrong configuration or insufficient description are:

Bad naming of a SCL element (e.g., invalid characters, name length, etc.).

Duplicate sub-elements in a given element.

Reference checks (verification that a given element really exists): In several places in an SCL instance file, a reference to another object in the file is specified (e.g., LNode to LN, LN to LNodeType).

Semantic data validation according to the standard (other than Part 6): This amounts to validate the LNodeType (thus the logical nodes) elements and their sub-elements. Parts 7-4 and 7-3 of the standard define the functions (i.e., logical nodes) and their mandatory/optional attributes. Several types of errors can be discovered, including:

Missing mandatory sub-element (e.g., a logical node of type "XCBR" does not contain a "Pos" data, a common data class "DPC" does not contain a "stVal" attribute).

Verification of the allowed sub-elements of a given elements. This extends the previous point in order to verify that only the sub-elements allowed by the standard are specified (or that the element is declared to be proprietary, see below), and are specified when needed. Further, Parts 7-3 and 7-4 specify that some elements are optional, mandatory, or can only appear in certain conditions (e.g., the "GC_1" or "AC_LN0_EX" condition).

Wrong type for an element (e.g., a "Pos" data should be of the common data class "DPC").

The order of attributes in a common data class is wrong (i.e., it does not follow the definitions in Part 7-3, and, for some common data classes, the extensions specified in Part 8-1).

Wrong functional constraint of a data attribute (e.g., an "XCBR.Pos.stVal" should have a ST functional constraint).

Wrong triggering option of a data attribute (e.g., an "XCBR.Pos.stVal" should have a "dchg"—data change—triggering option, whereas a "XCBR.Pos.d" should have none).

Proprietary extensions (e.g., for a logical node, a data) are not specified to be of a proprietary (i.e., other than "IEC 61850-7-4:2003") IEC 61850 namespace.

Any rule that is specified in the standard but cannot be enforced by an XML schema validator. For instance, the SCL schema defines that there are between 0 and 2 terminals for any conducting equipment. However, Table 5 in Part 5 defines the specific number of terminals for a conducting equipment depending on its type. Thus, a conducting equipment of type "CBR" should not have 1 terminal (even though this is valid with the SCL schema).

General power system rules that are typically not specified in the standard, but are common domain knowledge. For instance, the definition of a conducting equipment of type "CBR" should include at least one LNode of class "XCBR". As another example, a bay should include at least a connectivity node or at least a conducting equipment. Such rules are often application dependent and can often be viewed as warnings (instead of errors); however, they provide very useful hints at potential problems in an SCL file, or indicate partial engineering.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of validating a configuration description of an automation device in a power system, wherein said description is encoded in a standardized configuration description language based on an XML schema, and wherein said description is subject to notations, requirements and/or conventions which are not incorporated in said XML schema, comprising:
   identifying, from Parts 7-2, 7-3 and 7-4 of an International Electrotechnical Committee 61850 standard, notations to be validated;
   generating therefrom extended rules in a computer-readable format;
   checking said description for conformance to the extended rules; and
   issuing, in case a discrepancy is found, a notification to a user,
   displaying, via a Human-Machine Interface, the notification to the user.

2. The method according to claim 1, wherein the conformance checking is executed during an engineering phase of a Substation Automation (SA) system.

3. The method according to claim 1, comprising:
   checking the description for consistency with a rule generated from notations as defined in Part 7-2, 7-3 and 7-4 of the International Electrotechnical Committee 61850 standard.

4. The method according to claim 1, comprising:
   checking the description for consistency with a rule representing application specific, project specific or other user defined requirements.

5. The method according to claim 1, comprising:
   checking the description for consistency with power system operation principles.

6. A non-transitory computer readable medium containing a computer program for validating a configuration description of a Substation Automation (SA) system or of an Intelligent Electronic Device (IED), wherein said description is encoded in a Standardized Configuration description Language (SCL) based on an XML schema, and wherein said description is subject to notations, requirements and/or conventions from Parts 7-2, 7-3 and 7-4 of an International Electrotechnical Committee 61850 standard, which are not incorporated in said XML schema, to be validated the computer program performing, when executed, the steps of:
   checking said description for conformance with extended rules generated in a computer-readable format from the notations, requirements or conventions to be validated; and
   issuing, in case a discrepancy is found, a notification to a user.

7. A non-transitory computer readable storage medium containing a computer program for execution by a computer for validating a configuration description of a Substation Automation system or of an Intelligent Electronic Device, wherein said description is encoded in a Standardized Configuration description Language based on an Extensible Markup Language schema, and wherein said description is subject to notations, requirements and/or conventions which are not incorporated in said schema, wherein the computer program performs the steps of:
   identifying, from Parts 7-2, 7-3 and 7-4 of an International Electrotechnical Committee 61850 standard, notations, to be validated;
   generating there from extended rules in a computer-readable format;
   checking said description for conformance to the extended rules; and
   issuing, in case a discrepancy is found, a notification to a user.

8. The computer readable storage medium according to claim 7, wherein the step of conformance checking is executed during an engineering phase of the Substation Automation system.

9. The computer readable storage medium according to claim 7, wherein the computer program performs the step of:
   checking the description for consistency with a rule generated from notations.

10. The computer readable storage medium according to claim 7, wherein the computer program performs the step of:
    checking the description for consistency with a rule representing application specific, project specific or other user defined requirements.

11. The computer readable storage medium according to claim 7, wherein the computer program performs the step of:
    checking the description for consistency with power system operation principles.

12. The method according to claim 1, wherein the automation devices are Substation Automation systems and/or Intelligent Electronic Device components of the Automation systems.

13. The method according to claim 1, wherein the power system includes one or more of wind power, hydropower and Distributed Energy Resources (DER) components.

* * * * *